United States Patent [19]

White

[11] 4,293,902

[45] Oct. 6, 1981

[54] TRANSFORMERLESS FAST CURRENT LIMITER WITH SYMETRY CORRECTION FOR A SWITCHED-MODE POWER SUPPLY

[75] Inventor: John E. White, Port Moody, Canada

[73] Assignee: AEL Mirrotel, Ltd., Burnaby, Canada

[21] Appl. No.: 102,207

[22] Filed: Dec. 4, 1979

[51] Int. Cl.³ .......................................... H02P 13/22
[52] U.S. Cl. ..................................................... 363/26
[58] Field of Search ............................ 363/17, 24–26, 363/56

[56] References Cited

U.S. PATENT DOCUMENTS

| | | | |
|---|---|---|---|
| 3,859,586 | 1/1975 | Wadlington | 363/25 |
| 3,873,903 | 3/1975 | Koetsch et al. | 363/25 |
| 3,916,282 | 10/1975 | Rothermal | 363/25 |
| 3,930,194 | 12/1975 | Walker | 363/56 |

FOREIGN PATENT DOCUMENTS

| | | | |
|---|---|---|---|
| 2246002 | 4/1975 | France | 363/26 |
| 1525714 | 9/1978 | United Kingdom | 363/25 |

Primary Examiner—William H. Beha, Jr.
Attorney, Agent, or Firm—Leonard R. Cool

[57] ABSTRACT

A switched mode power supply employs a pulse width modulation controlled DC-to-DC converter to change a first voltage from a source of DC power into a regulated power source providing direct current at a second DC voltage. A transformerless current-sensing device is adapted for connection in the path between said source and said converter and provides a control signal which is representative of the current flowing in said path. A current-limiter control circuit is responsive to said control signal and provides an enabling output state when the sensed-current exceeds a predetermined value. The enabling state overrides the pulse width modulator control and inhibits the converter, thus terminating the output pulse when the sensed current exceeds said predetermined value.

4 Claims, 4 Drawing Figures

TRANSFORMERLESS FAST CURRENT LIMITER WITH SYMETRY CORRECTION FOR A SWITCHED-MODE POWER SUPPLY

BACKGROUND OF THE INVENTION

1. Field of the Invention

This invention relates to switching power supplies which employ pulse-width modulation, and in particular to a current limiter therefor.

2. Background Description

With the advent of the transistor and subsequently the introduction of integrated circuits, the demand for small, light-weight, regulated low-voltage power supplies required that substantial changes were necessary in power supply design. Today, the majority of power supply specifications require that relatively low voltage DC outputs, usually stabilized, be derived from 50 or 60 Hz AC mains. Conventional power supplies do not meet present day requirements because such power supplies usually include a heavy, bulky and expensive mains frequency transformer, rectifiers, capacitors having a large storage capacity, and smoothing inductors which provide, in combination, energy storage and smoothing and linear series regulators, which are inefficient and bulky. In addition, very large heat sinks are required in order to dissipate energy so as to cool the power dissipating components. In such conventional linear regulators, something like 80% of the bulk of the unit is accounted for by three things. The mains transformer, the electrolytic capacitors, and the heat sinks required to cool the power-dissipating components consisting of rectifiers and series-path transistors.

The problem of size and weight can be reduced if it is possible to increase the operating frequency from that normally found in conventional AC mains. For this reason, the pulse-width-modulated power supply was developed. In such a power supply, a DC voltage is obtained from a DC power source. This DC voltage may be derived by line rectification and transformation from the AC mains input. The output of the DC power source is applied directly to a switching inverter. Typically, such inverters include switching transistors connected either in a bridge, half-bridge or push-pull arrangement, whereby a square-wave pulse output is applied to the primary of a transformer. The on-time of the switching transistors is controlled by a pulse-width modulator which combines the functions of regulation with control of the inverter. A DC feedback circuit from the output of the power supply, which provides a measure of the output voltage, is applied as one input to a comparator, which is compared against a reference voltage so as to cause the pulse-width modulator to change the on-time of the switching transistors in order to maintain the regulator output voltage. The pulse-width modulator operates under control of a clock which may operate at a frequency in the order of 40 kHz. Such pulse-width-modulated power supplies are well-known, and one such is described in an article entitled, "Switching Power Supplies: Why and How", by Malcolm, Burchall, p. 73-75, Electronic Engineering, September 1973. A pulse-modulated power supply operating on a clock frequency of 40 kHz is described in an article entitled "Use a Pulse-Width-Modulated Switcher", J. H. O'Neal, vol. 25, no. 8, Electronic Design, Apr. 12, 1977, p. 110-115, and present-day power supply designs are described in the text entitled "Switching and Linear Power Supply, Power Converter Design", Abraham I. Pressman, Hayden Book Company Inc., 1st printing 1977.

In addition to controlling the on-time of the switching transistors in the inverter circuit, it is necessary to have a current-limiter mechanism in order to avoid destruction of components, such as the switching transistors. In the prior-art systems, it is not uncommon to sense the current in the inverter circuit rather than at the output of the power supply, because the current amplitude is normally less, and there is effective protection where it is most useful. However, the prior-art circuits normally use either a full bridge or one-half bridge configuration, and in these circuits, the current is sensed using a resistively loaded current transformer in series with the primary of the output transformer of the inverter. A number of disadvantages accrue by the use of the current transformer, which is necessary for isolation purposes. First, the transformer removes DC information from the current pulses, which necessitates some form of DC restoration or rectification after the transformation. Further, the time constants in the current-sensing loop are longer than the current pulse width and thus allows for integration of the switching element current pulses. This creates the possibility of an overcurrent condition occurring in the switching elements before the current-limiting circuit has time to respond to a current overload condition. Further, where latching-type circuits are employed to turn off the power supply on the occurrence of the first overcurrent condition, and subsequently allowing the power supply to attempt to restart, problems are introduced when the power supply cycle is turned on and off.

SUMMARY OF THE INVENTION

A switched mode power supply employs a pulse width modulation controlled DC-to-DC converter to change a first voltage from a source of DC power into a regulated power source providing direct current at a second DC voltage. A transformerless current-sensing device is adapted for connection in the path between said source and said converter and provides a control signal which is representative of the current flowing in said path. A current-limiter control circuit is responsive to said control signal and provides an enabling output state when the sensed-current exceeds a predetermined value. The enabling state overrides the pulse width modulator control and inhibits the converter, thus terminating the output pulse when the sensed current exceeds said predetermined value.

DETAILED DESCRIPTION OF THE INVENTION

Figure 1:
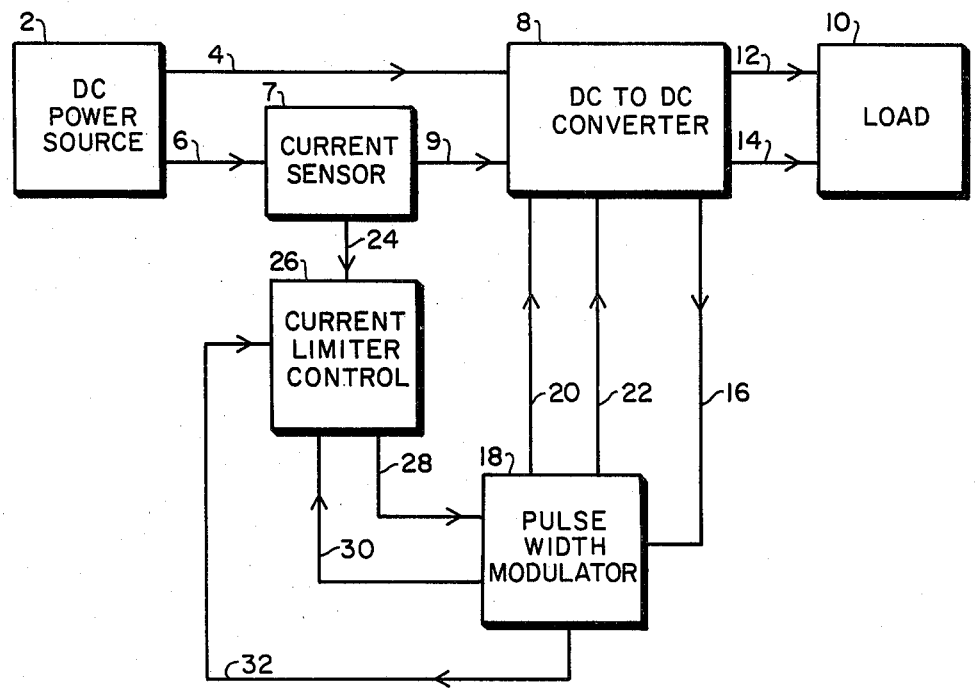
FIG. 1 is a block diagram, illustrating the elements of a pulse-width-modulated power supply employing current-sensing and current-limiter control circuits of the invention.

A general configuration of the preferred embodiment of the invention is illustrated in FIG. 1, where the DC-to-DC converter 8 receives the DC-input power from DC power source 2 via paths 4 and 6, current sensor 7, and path 9. Pulse width modulator 18 controls the on-time of the inverter element of the converter 8 to maintain the output voltage constant on paths 12 and 14 in the absence of a need for current limiting. When the output of current sensor 7 indicates that a need for current limiting has occurred, a control signal is applied to modulator 18 via path 28. This control signal modifies the on-time of modulator 18 and the effect is to cause the converter to change from a constant-voltage source to a constant-current source in order to effect the current limit control. The manner in which the various elements perform their intended functions can be more readily understood by referring to FIG. 2, which is a detailed schematic diagram of the preferred embodiment of the invention.

Figure 2:
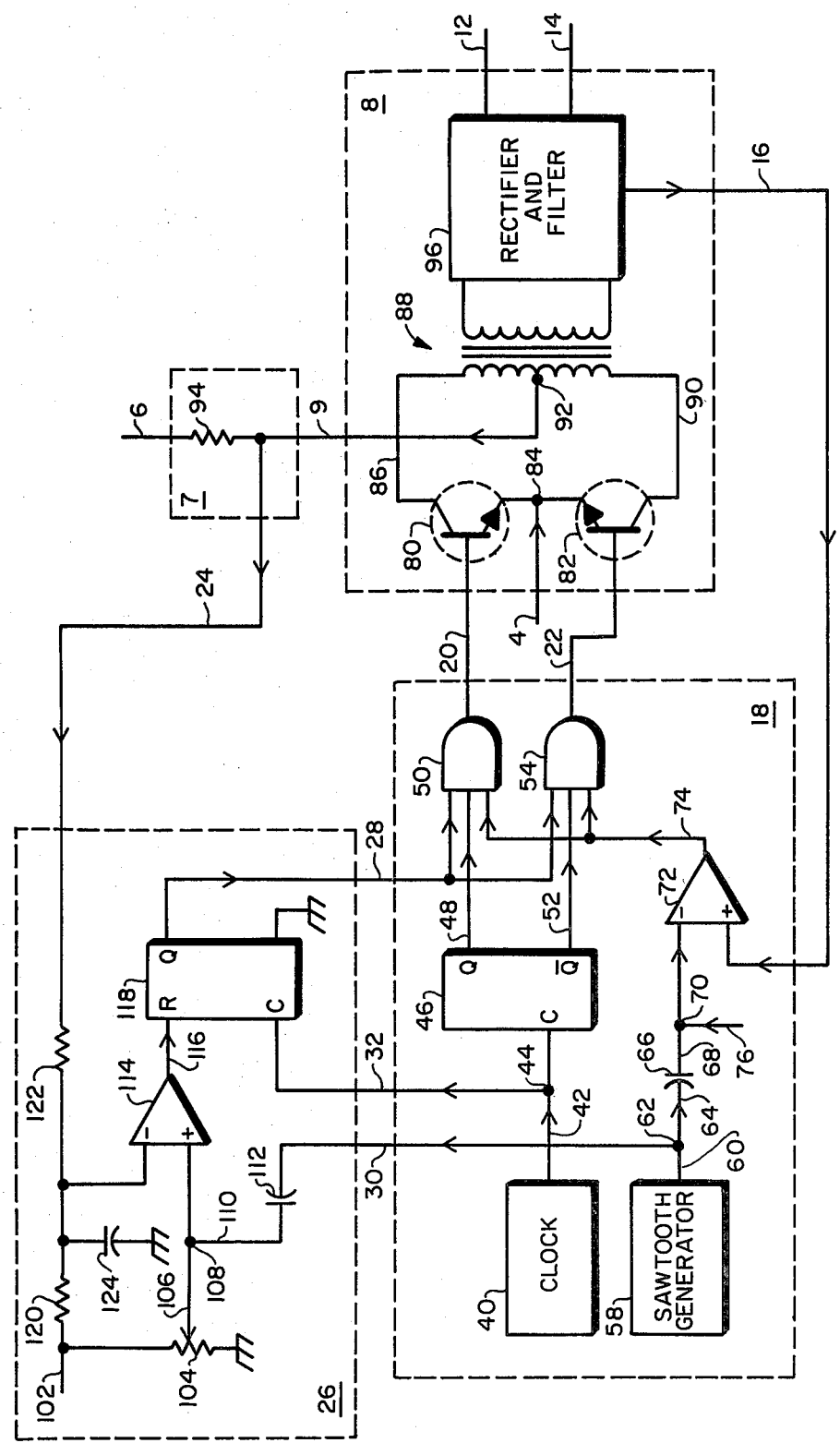
FIG. 2 is a detailed schematic diagram illustrating the pulse-width-modulated power supply current-sensing elements and current-limiter control circuit arrangement.
Figure 3:
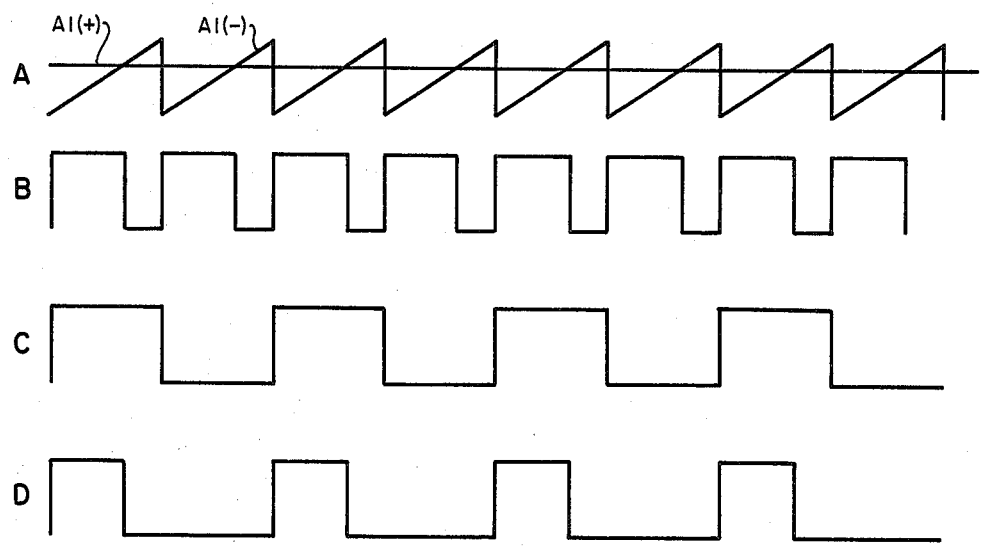
FIG. 3 is a waveform diagram, illustrating the operation of a pulse-width-modulated power supply without current limiting.

Referring now to FIG. 2, it may be seen that DC-to-DC converter 8 comprises essentially a pair of transistors 80 and 82, connected in a push-pull arrangement, transformer 88, and rectifier and filter 96. The emitter-electrodes of switching transistors 80 and 82 are connected together to form a junction 84, which is the connection point to DC power source 2 via path 4. The collector of transistor 80 is connected via path 86 to one end of the primary winding of transformer 88, and the collector of transistor 82 is connected via path 90 to the other end of said primary winding. The center tap 92 of the primary winding is connected to the output terminal of current sensor 7 via path 9. The on-time of switching transistors 80 and 82 is controlled by the bias voltage applied to the respective base electrodes via AND-gates 50 and 54, respectively. Each gate has three inputs. A first input is obtained from clock 40 via flip-flop 46. As may be seen the Q output is connected via path 48 to one input of AND-gate 50 and the $\overline{Q}$ input is connected via path 52 to AND-gate 54. Thus, the AND-gates are alternately enabled by clock pulses from clock 40 and, absent disabling signals at the other inputs, the switching transistors would be alternately turned on, and would remain on for the duration of the clock pulse. However, two additional control signals are each applied to the two AND-gates 50 and 54. Thus, the second input to each AND-gate is applied from comparator 72 via path 74. The normal output from comparator 72 is an enabling signal. As may be seen, comparator 72 has as one input a first control signal, representative of the output voltage of converter 8, which is applied to the non-inverting input via path 16; and, as a second input a reference voltage made up from a combination of a sawtooth signal and a fixed reference voltage. This latter (sawtooth reference) is shown as waveform A1(−) in FIG. 3, line A, while the first control signal (output voltage reference) is shown as wavform A1(+) FIG. 3, line A. Only the operation of one transistor is shown in FIG. 3. As previously noted, the clock 40, shown at line C, FIG. 3, alternately enables AND-gates 50 and 54 via flip-flop 46, and provides the maximum on time of each transistor. The Q1 output of flip-flop 46 is shown in the waveform at C FIG. 3. A sawtooth generator 58 operating at the clock rate provides a sawtooth waveform via path 60, junction 62, path 64, AC-coupling capacitor 66, path 68 to the non-inverting input of differential amplifier 72. AC-coupling capacitor 66 is employed so as to avoid any adverse effect with the DC bias applied via path 76, junction 70 and path 68 to the non-inverting input. The DC reference voltage is not shown, but the amplitude will be selected so as to establish the desired DC output voltage at the output of DC-to-DC converter 8. As stated above, the effects of the voltage inputs to differential amplifier 72 are illustrated in the waveforms shown in FIG. 3. The DC feedback voltage from path 16 to the non-inverting input of differential amplifier 72 is shown as a straight line in waveform A and is marked A1(+). The sawtooth waveform from generator 58 is illustrated and is marked A1(−). The output on path 74 is illustrated in waveform B, and it will be noted that an enabling output is present during the period when the ramp voltage is below that supplied by the DC feedback circuit. Thus, an enabling input signal is normally supplied from the differential amplifier 72 to a second input of each of the AND-gates 50 and 54. The structure as has now been described comprises the basic elements of a pulse-width-modulated power supply. Neglecting, for the moment, the presence of current-limiter control circuitry, it would be seen that the AND-gates 50 and 54 would be alternately enabled by the output from flip-flop 46, but the time during which they would be enabled for each clock pulse would be determined by differential amplifier 72, which provides the control output signal of the pulse-width modulator. The outputs of AND-gates 50 and 54 are connected, respectively, to the bases of transistors 80 and 82 via paths 20 and 22. Thus, during the one period, AND-gate 50 would be enabled, thus turning on transistor 80, allowing the square-wave current to flow via path 4 to the emitter of transistor 80, thence to the collector and then through the upper portion of the primary winding of transformer 88 to junction 92, path 9, current sensor 7, and path 6 back to the DC power source. During the next clock cycle, the current would pass through the transistor 82, the lower half of transformer primary winding 88, thus providing an alternating waveform input to transformer 88, which is transformed to the secondary winding of transformer 88 and is then rectified and filtered in 96 to provide a regulated DC output to the load via paths 12 and 14. The addition of the current-limiter control circuit modifies the operation just described by adding an overriding control for the on-time of the transistors 80 and 82. This is effected as follows.

Current sensor 7 is shown as a resistor in FIG. 2 and provides a voltage which is representative of the current flowing from the DC power source 2 into the inverter input circuit. This voltage is transmitted via path 24 to the inverting input A2(−), of comparator 114 via bias resistors 120 and 122. A DC bias voltage, not shown, is applied via path 102 and variable resistor 104 and path 106 to the non-inverting input of comparator 114, A2(+). In addition, the sawtooth waveform from generator 58 is applied via path 60, junction 62, path 30, AC coupling capacitor 112, and path 110 to the non-inverting input, A2(+) of the comparator 114. This AC coupling capacitor 112 is employed so as not to upset the DC bias established by variable resistor 104. A variable resistor is employed so that the DC bias can be varied, thus permitting adjustment of the overcurrent threshold. When the output of the current sensor produces a voltage, shown at F, FIG. 4, which is high enough to intercept the ramp as shown at waveform G in FIG. 4, the output of comparator 114 (A2) will briefly change state. This is shown by the vertical lines at waveform H, FIG. 4. The state of the Q-output from flip-flop 118 will thus change state as shown in waveform I, FIG. 4. This causes the flip-flop 118 (FFL) to change from an enable to a disable condition, and this is applied via path 28 to a third input of each of the AND-gates 50 and 54. Thus, when comparator 114 temporarily changes state, flip-flop 118 provides an inhibit output to gates 50 and 54, thus disabling these gates and turning off the switching elements, transistors 80 and 82. This condition remains until the flip-flop 118 is set back to its enable state by the next clock pulse, which is supplied, as may be seen, from clock 40 via junction 44 and path 32 to the clock input thereof. If the overcurrent condition still exists, the duty cycle, i.e., the on-time of the inverter will again be terminated after a short duration following the beginning of the clock period. Otherwise, normal operation on the pulse-width-modulated power supply will resume. Thus, current limiting is effected for each pulse period and during current limiting the circuit operates in a constant current mode.

In addition to the protection of components, another important advantage is obtained because the current limiting during each pulse period corrects for asymmetry which may occur in the primary switching circuits. In prior art systems, large current spikes may flow in the switching elements and main power transformer because of the unequal storage time and saturation voltages of the switching elements. The result is a somewhat non-symmetrical rectangular waveform predominantly due to one element being on longer than the other element. This gives rise to a DC component (offset) on the waveform. The DC offset causes direct current to flow in the power transformer primary which results in the core magnetization taking on a DC bias. With each cycle, the core accumulates incremental bias until it is finally driven to saturation at one end of the B-H curve. At this point, the current in the switching element will rise to a very high level (current spikes) with attendant problems. By current limiting during each pulse period, as is accomplished by the instant invention, current spiking is essentially eliminated and the asymmetry in the primary switching circuits is corrected.

Figure 4:
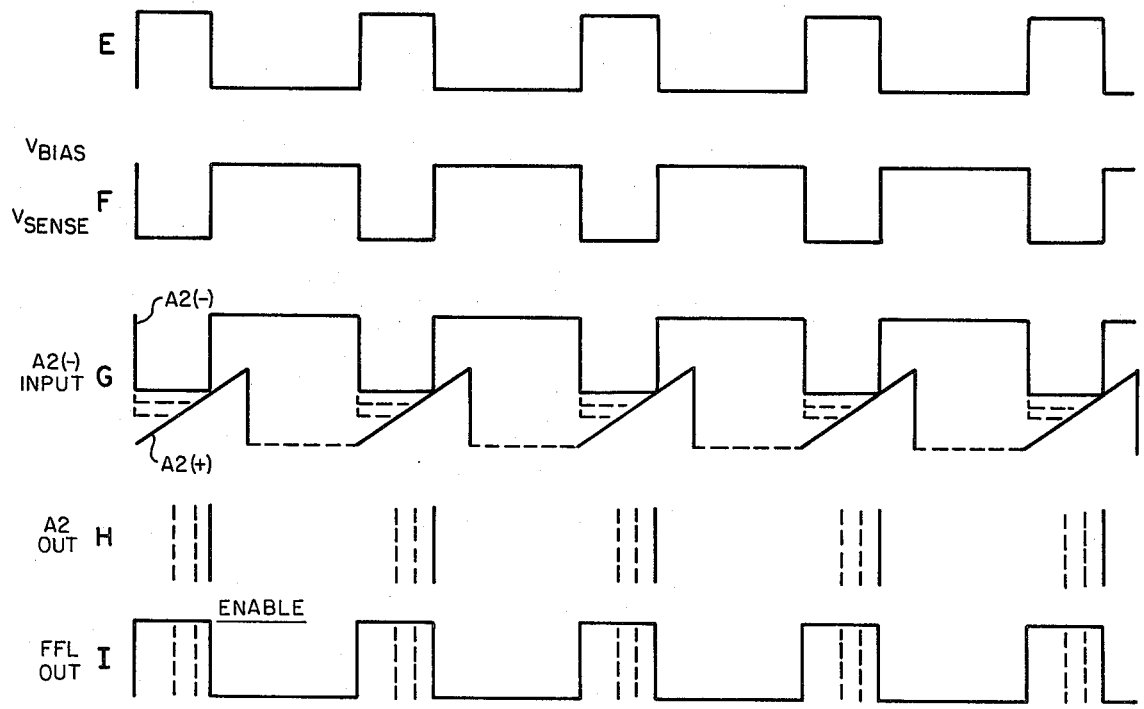
FIG. 4 is a waveform diagram, illustrating the modification from the pulse-width-modulated waveforms of FIG. 3 when the current-limiting of the instant invention is employed.

Referring again to waveform G of FIG. 4, it is to be noted that an increase in output of waveform F, i.e., an increase in current, will cause the output of the comparator 114 to occur earlier, and therefore this increase in overcurrent will cause a reduction in the duty cycle.

Capacitor 124 acts in conjunction with resistor 120 to form a simple filter, which attenuates spikes which are commonly found on the real waveform of the input current.

While the invention has been particularly shown and described with reference to a preferred embodiment thereof, it will be understood by those skilled in the art that changes in form and detail may be made therein, without departing from the spirit and scope of the invention.

What is claimed is:

1. In a switched mode power supply which operates from a DC power source, a fast current limiter comprising:

a DC-to-DC converter adapted for connection to said DC power source includes a pair of switching transistors connected in push-pull wherein the emitters are connected together and to one terminal of the power source, the collectors are connected to the opposite ends of a primary winding of a center-tapped transformer, the center-tap is connected to the other terminal of the power source and the secondary winding is connected to a rectifier-filter circuit in which the pulsed output from the inverter is changed into a DC voltage which is available at output terminals thereof and in which a voltage representative of the output voltage is provided at a feedback output terminal;

a pulse width modulator having first and second gating circuits, the output terminals of which are connected to the bases of said first and second switching transistors, respectively, and provide the drive thereof, a clock for establishing a pulse repetition rate of the transistors and means connected to the output of said clock for alternately enabling said first and second gating circuits, a sawtooth generator operating at said predetermined pulse repetition rate for providing a sawtooth reference voltage at an output, and a first comparator having a first input connected to the output of said sawtooth generator, a second input connected to said feedback output terminal of said converter and an output connected to an input of each said gating circuit so as to control the on-time of the switching transistor connected to an enabled gating circuit as long as there is no overcurrent present;

a transformerless current-sensing means, adapted for connection in the path between said DC power source and said converter, for providing, at an output terminal, an output signal representative of the current flowing in said path; and a current-limiter control comprising:

a second comparator responsive to said sawtooth voltage and to the output signal of said transformerless current-sensing means for changing the second comparator output of a first binary state to the other binary state at an output terminal when the sensed current exceeds a predetermined value;

a third gating circuit responsive to the output condition from said second comparator means and a timing signal from said clock to provide an enable or pulse termination state at said output, depending upon whether the sensed current is below or exceeds said predetermined value; and means for connecting the output of said third gating circuit to a third input of each of said first and second gating circuits, whereby said first and second switching transistors are turned off if an overcurrent occurs in either of the clock enabled states.

2. The switched-mode power supply as set forth in claim 1 wherein said comparator further comprises:

a second DC reference voltage;

a differential amplifier having the non-inverting input adapted to receive the output signal from said transformerless current-sensing means, and having the non-inverting input adapted for connection to said second DC reference and said sawtooth generator.

3. A switched-mode power supply as set forth in claim 2 wherein said gating means further comprises;

a flip-flop, having a reset input connected to the output of said comparator, having the clock input connected to the output terminal of said clock source, and having the Q-output connected to said output terminal of the current-limiter control means.

4. A switched-mode power supply as set forth in claim 3 wherein said transformerless current-sensing means further comprising a resistor connected in series in the path between said source of power and said DC-to-DC converter.

* * * * *